US008607912B2

(12) United States Patent
Mallette et al.

(10) Patent No.: US 8,607,912 B2
(45) Date of Patent: Dec. 17, 2013

(54) SNOWMOBILE SUSPENSION

(75) Inventors: Bertrand Mallette, Rock Forest (CA);
Berthold Fecteau, Richmond (CA);
Sebastien Thibault, Sherbrooke (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 13/334,706

(22) Filed: Dec. 22, 2011

(65) Prior Publication Data
US 2012/0205173 A1 Aug. 16, 2012

Related U.S. Application Data

(63) Continuation-in-part of application No. PCT/US2009/068714, filed on Dec. 18, 2009.

(51) Int. Cl.
*B62M 27/02* (2006.01)
(52) U.S. Cl.
USPC .......................................... 180/193
(58) Field of Classification Search
USPC .......................................... 180/193
See application file for complete search history.

(56) References Cited

U.S. PATENT DOCUMENTS

| | | | |
|---|---|---|---|
| 5,727,643 A * | 3/1998 | Kawano et al. ............... | 180/193 |
| 5,904,216 A | 5/1999 | Furasawa | |
| 6,631,778 B2 | 10/2003 | Mallette | |
| 7,070,012 B2 | 7/2006 | Fecteau | |
| 7,523,799 B2 | 4/2009 | Yoshihara | |
| 7,854,285 B1 | 12/2010 | Giese | |
| 2005/0016784 A1 * | 1/2005 | Fecteau ......................... | 180/182 |
| 2007/0175686 A1 * | 8/2007 | Yoshihara .................... | 180/190 |

FOREIGN PATENT DOCUMENTS

WO 2011075141 A1 6/2011

OTHER PUBLICATIONS

International Search Report from PCT/US2009/068714; Feb. 23, 2010; Lee W. Young.

* cited by examiner

*Primary Examiner* — Tony Winner
(74) *Attorney, Agent, or Firm* — BCF LLP

(57) ABSTRACT

A suspension system for a snowmobile has a rail and first and second suspension arms having lower ends pivotally connected to the rail. A first shock absorber pivotally connected between the first suspension arm and the rail. A second shock absorber operatively pivotally connected between the first suspension arm and the rail. Left and right brackets are connected to the second suspension arm. Left and right tie rods have lower ends operatively pivotally connected to the first suspension arm and upper ends pivotally connected to their corresponding brackets about a first pivot axis. The second shock absorber is disposed laterally between the left and right tie rods. The suspension is movable between a first position where the first pivot axis intersects the second shock absorber and a second position where the first pivot axis is spaced from the second shock absorber.

23 Claims, 13 Drawing Sheets

SNOWMOBILE SUSPENSION

CROSS-REFERENCE

The present application is a continuation-in-part of International Patent Application No. PCT/US2009/068714, filed Dec. 18, 2009, the entirety of which is incorporated herein by reference.

FIELD OF THE INVENTION

The present invention relates to suspension assemblies for tracked vehicles, and more particularly to rear suspension assemblies for snowmobiles.

BACKGROUND

Irregularities in the terrain over which a tracked vehicle travels produce displacements and deflections of its suspension system. Depending upon their magnitude, frequency and strength, these deflections cause more or less discomfort to the operator and passenger of the snowmobile.

The dynamic response of a rear suspension assembly of a tracked vehicle such as a snowmobile, to the multitude of loads imposed upon it during operation, has a significant effect on the overall performance of the vehicle and rider comfort. Different types of loads are regularly exerted upon a tracked vehicle. A first type of loads results from impact loads imposed upon the rear suspension as the vehicle travels over rough terrain and encounters bumps, these are of the most concern. A second type of loads results from loads resulting from acceleration and deceleration. The internal forces that are developed during rapid acceleration cause a weight transfer from the front of the vehicle to the rear. This tends to lift the skis off the ground and thus interferes with steering. The internal forces developed during rapid deceleration cause, however, a weight transfer from the rear of the vehicle to the front. This tends to compress the front of the tunnel toward the front of the slide rails.

The complex interaction of the forces which occur in the rear suspension assembly during operation have demanded optimal design of mechanisms for absorbing and attenuating the complex combination of loads imposed upon a modern high performance snowmobile.

Conventionally, the rear suspension supports the endless track, which is tensioned to surround a pair of parallel slide rails, a plurality of idler wheels and at least one drive wheel or sprocket. A shock absorbing mechanism involving compressed springs, hydraulic dampers, and/or other shock absorbing elements, urges the slide frame assembly and the chassis (also known as a frame) of the snowmobile apart, against the weight supported above the suspension in a static condition.

One example of a conventional rear suspension of a snowmobile is described in U.S. Pat. No. 5,727,643, issued to Kawano et al. on Mar. 17, 1998. Kawano et al. discloses a suspension device for providing a resilient support for a snowmobile body, including a frame for supporting the snowmobile body. A slide rail is operatively connected to the frame for pressing a crawler belt against a snow surface. A swing arm includes a first end pivotally supported on the frame and a second end pivotally mounted on the slide rail. A shock absorber assembly includes a first end pivotally supported on a shaft adjacent to the first end of the swing arm, a second end of the shock absorber assembly being connected to the frame through a progressive link pivotally supported on the swing arm.

Another example of a conventional rear suspension of a snowmobile is disclosed in U.S. Pat. No. 5,904,216, issued to Furusawa on May 18, 1999. Furusawa discloses a rear suspension of a snowmobile including two angular suspension arm assemblies, which connect the slide frame assembly to the snowmobile chassis. These suspension arm assemblies are moveable independently of one another in order to permit the slide frame assembly to react to static and dynamic forces arising during operation. A single cushion unit extends horizontally and is operatively connected at opposed ends thereof to the respective suspension arm assemblies in order to support and attenuate the loads.

Although conventional rear suspension systems available provide a relatively comfortable ride to the passengers, it is desirable to further improve the rear suspension assemblies for tracked vehicles, particularly snowmobiles. It is also desirable to provide a rear suspension assembly that would be designed to reduce effects due to acceleration and deceleration loads.

SUMMARY

It is an object of the present invention to ameliorate at least some of the inconveniences present in the prior art.

In one aspect, the present provides a suspension system for a snowmobile having a chassis and an endless drive track. The suspension assembly has a rail for engagement with the endless drive track; a first suspension arm having an upper end adapted for pivotally connecting to the chassis and a lower end pivotally connected to the rail, the first suspension arm extending forwardly and upwardly from the rail; a second suspension arm disposed rearwardly of the first suspension arm, the second suspension arm having an upper end adapted for pivotally connecting to the chassis and a lower end pivotally connected to the rail, the second suspension arm extending forwardly and upwardly from the rail; a first shock absorber having an upper end and a lower end, the upper end of the first shock absorber being pivotally connected to the first suspension arm, the lower end of the first shock absorber being pivotally connected to move with movement of the rail; a second shock absorber having an upper end and a lower end, the lower end of the second shock absorber being operatively pivotally connected to the rail, the upper end of the second shock absorber being pivotally connected to the second suspension arm; a left bracket connected to the second suspension arm, the left bracket being disposed on a left side of the second shock absorber; a right bracket connected to the second suspension arm, the right bracket being disposed on a right side of the second shock absorber; a left tie rod having a lower end and an upper end, the lower end of the tie rod being operatively pivotally connected to the first suspension arm, and the upper end of the left tie rod being pivotally connected to the left bracket about a first pivot axis; and a right tie rod having a lower end and an upper end, the lower end of the right tie rod being operatively pivotally connected to the first suspension arm, and the upper end of the right tie rod being pivotally connected to the right bracket about the first pivot axis. The second shock absorber is disposed laterally between the left and right tie rods. The suspension is movable between a first position where the first pivot axis intersects the second shock absorber and a second position where the first pivot axis is spaced from the second shock absorber.

In an additional aspect, the lower end of the first shock absorber is disposed forwardly of the lower end of the first suspension arm; and the lower end of the second shock absorber is disposed rearwardly of the lower end of the first shock absorber.

In a further aspect, a bracket arm has a first end and a second end. The first end of the bracket arm is fixedly connected to the first suspension arm between the upper end and the lower end of the first suspension arm. A link has a first end and a second end. The first end of the link is pivotally connected to the second end of the bracket arm. The lower end of the second shock absorber is pivotally connected to the second end of the link about a second pivot axis.

In an additional aspect, the first end of the link is pivotally connected to the second end of the bracket arm about a third pivot axis. The third pivot axis is above of the second pivot axis. The lower ends of the left and right tie rods are pivotally connected to the link about a fourth pivot axis intermediate the second and third pivot axes.

In a further aspect, the lower end of the first shock absorber is pivotally connected to the rail.

In an additional aspect, the lower end of the second shock absorber is operatively pivotally connected to the first suspension arm.

In another aspect, the present provides a suspension system for a snowmobile having a chassis and an endless drive track. The suspension assembly has a rail for engagement with the endless drive track; a first suspension arm having an upper end adapted for pivotally connecting to the chassis and a lower end pivotally connected to the rail, the first suspension arm extending forwardly and upwardly from the rail; a second suspension arm disposed rearwardly of the first suspension arm, the second suspension arm having an upper end adapted for pivotally connecting to the chassis and a lower end pivotally connected to the rail, the second suspension arm extending forwardly and upwardly from the rail; a first shock absorber having an upper end and a lower end, the upper end of the first shock absorber being pivotally connected to the first suspension arm, the lower end of the first shock absorber being pivotally connected to move with movement of the rail; a second shock absorber having an upper end and a lower end, the lower end of the second shock absorber being operatively pivotally connected to the rail, the upper end of the second shock absorber being pivotally connected to the second suspension arm; a left bracket connected to the second suspension arm, the left bracket being disposed on a left side of the second shock absorber, the left bracket including a left holder; a right bracket connected to the second suspension arm, the right bracket being disposed on a right side of the second shock absorber, the right bracket including a right holder; a left tie rod having a lower end and an upper end, the lower end of the tie rod being operatively pivotally connected to the first suspension arm, and the upper end of the left tie rod being pivotally connected to the left holder about a first pivot axis; and a right tie rod having a lower end and an upper end, the lower end of the right tie rod being operatively pivotally connected to the first suspension arm, and the upper end of the right tie rod being pivotally connected to the right holder about the first pivot axis. The second shock absorber is disposed laterally between the left and right tie rods. The suspension is movable between a first position and a second position. In the first position, at least portions of projections of the left and right holders onto a vertical plane overlap a portion of the second shock absorber. The vertical plane passes through a lateral center of the second shock absorber. In the second position, the projections of the left and right holders are spaced from the second shock absorber.

In an additional aspect, the second shock absorber includes a shock absorber body and a piggy-back chamber connected to the shock absorber body. In the first position at least the portions of the projections of the left and right holders overlap a portion of the shock absorber body.

In a further aspect, the left and right holders are left and right bushing holders. A left bushing is disposed in the left bushing holder. A left fastener passes through the left bushing and fastens the left tie rod to the left bushing holder. A right bushing is disposed in the right bushing holder. A right fastener passes through the right bushing and fastens the right tie rod to the right bushing holder.

In an additional aspect, the lower end of the first shock absorber is disposed forwardly of the lower end of the first suspension arm. The lower end of the second shock absorber is disposed rearwardly of the lower end of the first shock absorber.

In a further aspect, a bracket arm has a first end and a second end. The first end of the bracket arm is fixedly connected to the first suspension arm between the upper end and the lower end of the first suspension arm. A link has a first end and a second end. The first end of the link is pivotally connected to the second end of the bracket arm. The lower end of the second shock absorber is pivotally connected to the second end of the link about a second pivot axis. The first end of the link is pivotally connected to the second end of the bracket arm about a third pivot axis. The third pivot axis is above of the second pivot axis. The lower ends of the left and right tie rods are pivotally connected to the link about a fourth pivot axis intermediate the second and third pivot axes.

In an additional aspect, the lower end of the first shock absorber is pivotally connected to the rail.

In a further aspect, the lower end of the second shock absorber is operatively pivotally connected to the first suspension arm.

For purposes of this application, terms related to spatial orientation such as forwardly, rearwardly, upwardly, downwardly, left, and right, are as they would normally be understood by a driver of the vehicle sitting thereon in a normal riding position.

Embodiments of the present invention each have at least one of the above-mentioned object and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Figure 1:
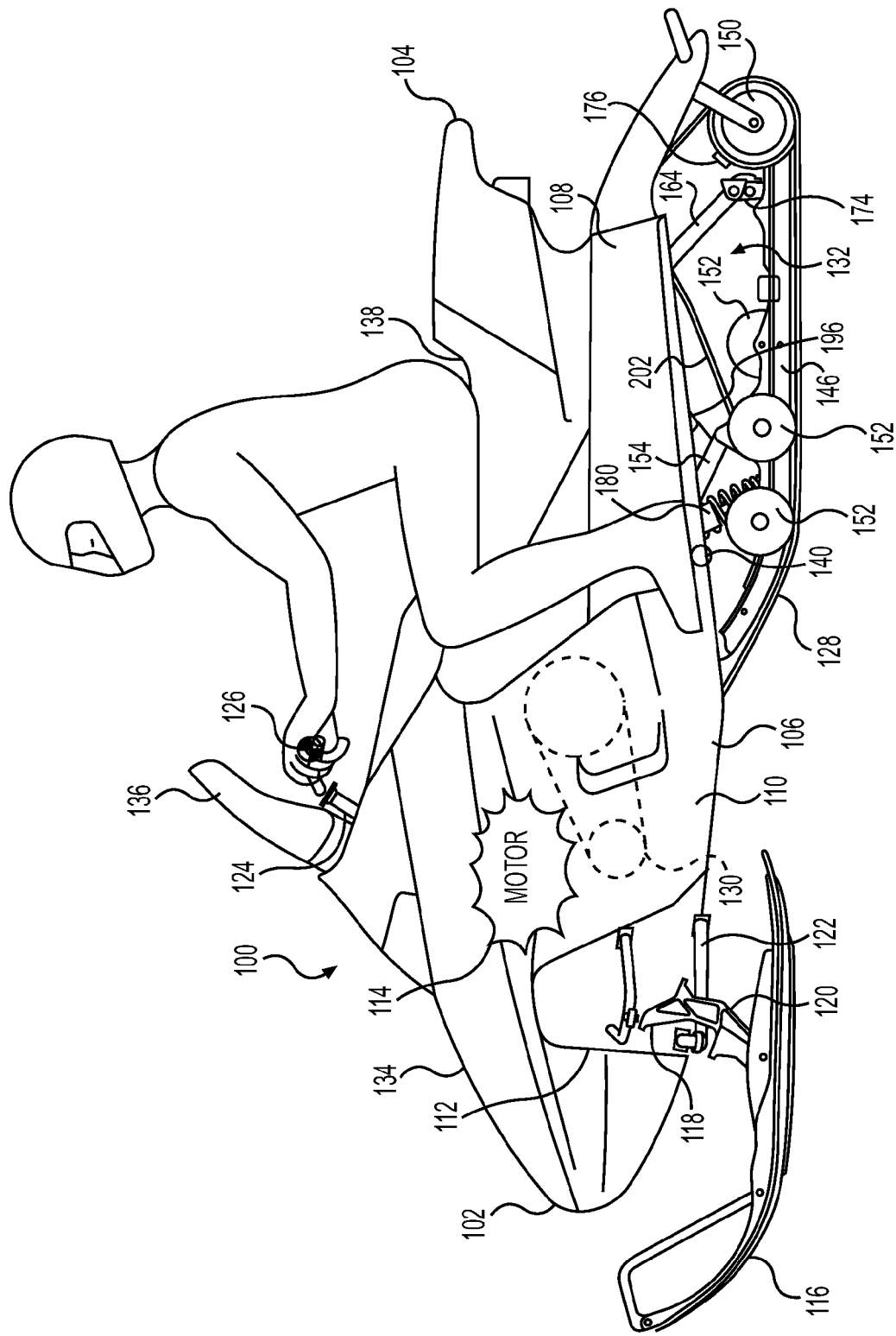
FIG. 1 is a left side elevation view of a snowmobile with a driver on the snowmobile in a straddling position.
Figure 2:
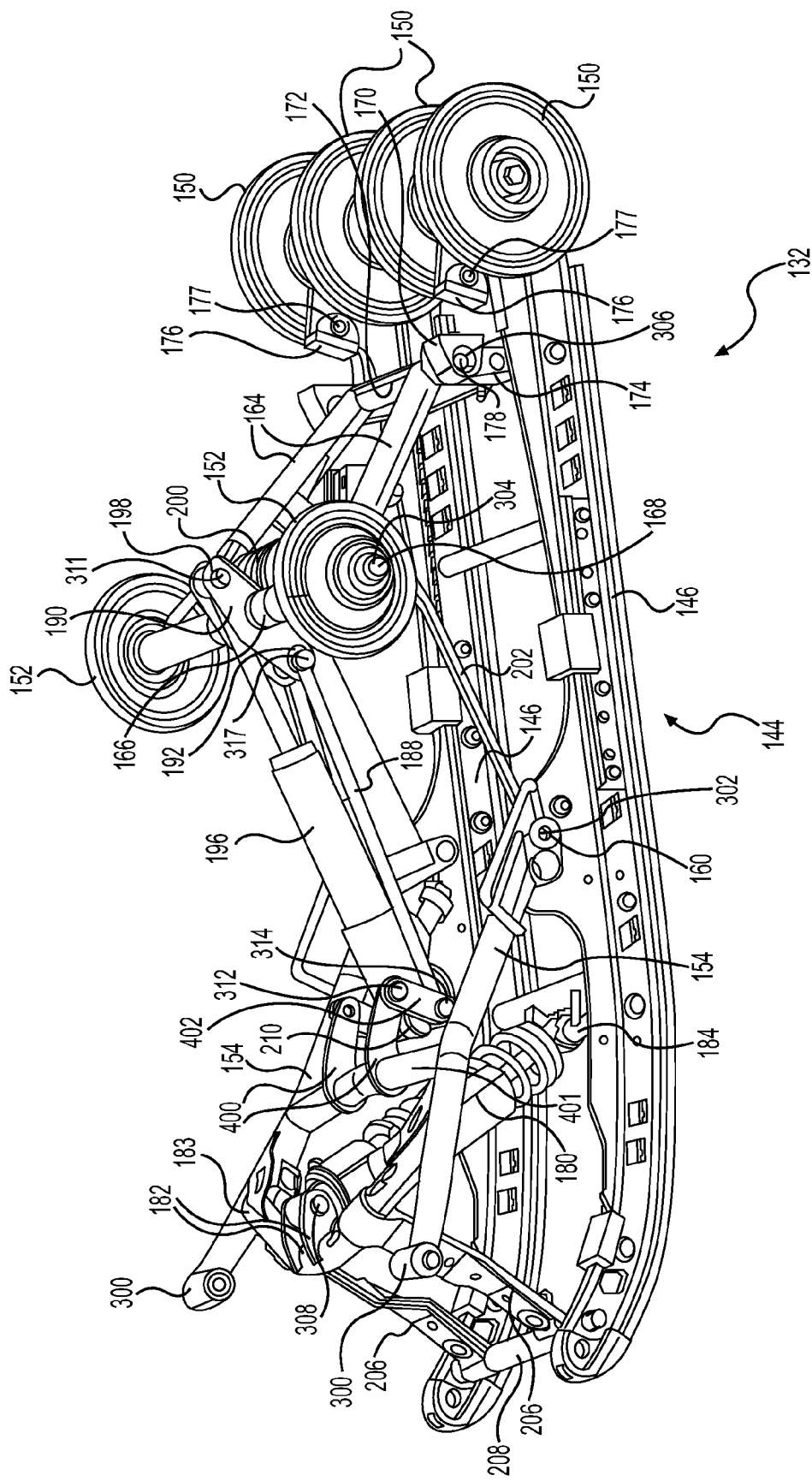
FIG. 2 is a perspective view taken from a front, left side of a suspension assembly according to a first embodiment of the invention.
Figure 3:
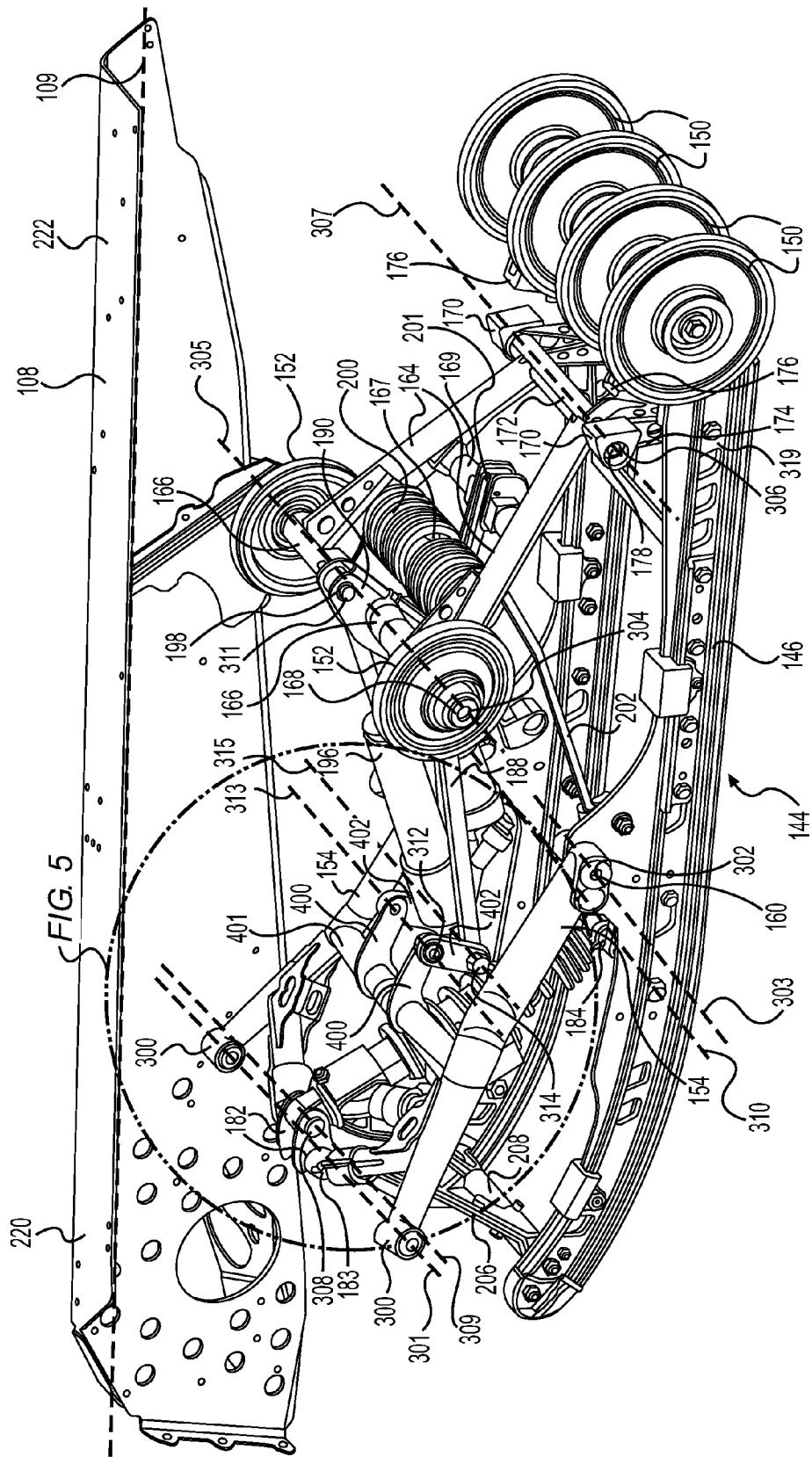
FIG. 3 is a perspective view taken from a rear, left side of the suspension assembly of FIG. 2 with a tunnel shown with some elements removed and the tunnel partially cut off added for clarity.

Referring now in detail to the drawings, and primarily to FIG. 1, a snowmobile incorporating the present invention is identified generally by the reference numeral 100.

The snowmobile 100 includes a front end 102 and a rear end 104, which are defined consistently with the forward travel direction of the vehicle. The snowmobile 100 includes a chassis 106 which normally includes a tunnel 108, an engine cradle portion 110 and a front suspension assembly portion 112. An engine 114 which is schematically illustrated, is carried by the engine cradle portion 110 of the chassis 106. A ski and steering assembly is provided, in which two skis 116 (only one of which is shown) are positioned at the front end 102 of the snowmobile 100, and are attached to the front suspension assembly portion 112 of the chassis 106 through a front suspension assembly 118. The front suspension assembly 118 includes ski legs 120, supporting arms 122 and ball joints (not shown) for operatively joining the respective ski legs 120, supporting arms 122 and a steering column 124. The steering column 124 at its upper end is attached to a steering device such as a handlebar 126 which is positioned forward of a rider and behind the engine 114 to rotate the ski legs 120 and thus the skis 116, in order to steer the vehicle.

An endless drive track 128 is positioned at the rear end 104 of the snowmobile 100 and is disposed under the tunnel 108. The endless drive track 128 is operatively connected to the engine 114 through a belt transmission system 130 which is schematically illustrated by broken lines. Thus, the endless drive track 128 is driven to run about a rear suspension assembly 132 for propulsion of the snowmobile 100. The rear suspension assembly 132 will be described in greater detail below.

At the front end 102 of the snowmobile 100, there are provided fairings 134 that enclose the engine 114 and the belt transmission system 130, thereby providing an external shell that not only protects the engine 114 and the belt transmission system 130, but can also be decorated to make the snowmobile 100 more aesthetically pleasing. Typically, the fairings 134 include a hood and one or more side panels which can be opened to allow access to the engine 114 and the belt transmission system 130 when this is required, for example for inspection or maintenance of the engine 114 and/or the belt transmission system 130. A windshield 136 is connected to the fairings 134 near the front end 102 of the snowmobile 100, or may be attached directly to the handlebar 126. The windshield 136 acts as a windscreen to lessen the force of the air on the rider while the snowmobile 100 is moving.

A seat 138 extends from the rear end 104 of the snowmobile 100 to the fairings 134. A rear portion of the seat 138 may include a storage compartment, or may be used to accept a passenger seat. Two foot rests 140 (only one of which is shown) are positioned on opposed sides of the snowmobile 100 below the seat 138 to accommodate the rider's feet.

The endless drive track 128 is engaged with and driven by a drive sprocket (not shown) which is journaled by the tunnel 108 and is driven by the engine 114 through the belt transmission system 130. The endless drive track 128 is suspended for movement relative to the chassis 106, by the rear suspension assembly 132. The rear suspension assembly 132 includes a slide frame assembly 144 which primarily includes a pair of spaced apart slide rails 146 that engage the inner side of the ground-engaging portion of the endless drive track 128. The slide frame assembly 144 journals a plurality of backup rollers (not shown) and four idler rollers 150. In addition, further rollers 152 are carried by the tunnel 108, in order to define the path over which the endless drive track 128 travels.

Referring to FIGS. 2 to 5, the rear suspension assembly 132 according to a first embodiment of the invention will now be described in greater details. The rear suspension assembly 132 comprises left and right front suspension arms 154 and left and right rear suspension arms 164. It is contemplated that the left and right rear suspension arms 164 could be welded together to form a single rear suspension arm.

The front suspension arms 154 extend downwardly and rearwardly from a front portion 220 of the tunnel 108. Upper ends of the front suspension arms 154 are pivotally attached to the tunnel 108 at pivot points 300 to form a pivot axis 301 (shown in FIG. 3) that is perpendicular to the longitudinal axis 109 of the tunnel 108. The lower ends of the front suspension arms 154 are each pivotally attached to their respective slide rails 146 of the slide frame assembly 144 by a pivot pin assembly 160 at pivot point 302. Left and right pivot points 302 define a pivot axis 303 (shown in FIG. 3) perpendicular to the longitudinal axis 109 of the tunnel 108. The movement of the front portions of the slide rails 146 relative to the tunnel 108 of the chassis 106 causes the front suspension arms 154 to rotate about the axis 301, relative to the tunnel 108. The front suspension arms 154 are made of metal tubes having a generally circular cross-section. It is contemplated that the front suspension arms 154 could have other cross-sections, and that the front suspension arms 154 could be of another material than metal.

The rear suspension arms 164 extend downwardly and rearwardly from a rear portion 222 of the tunnel 108, and are disposed rearward of the front suspension arms 154. The rear suspension arms 164 are made of metal tubes of a general circular cross-section. It is contemplated that the rear suspension arms 164 could have other cross-sections, and that the rear suspension arms 164 could be of another material than metal. The rear suspension arms 164 are pivotally attached to the tunnel 108 of the chassis 106 at pivot points 304 by means of a tube and shaft assembly. The tube and shaft assembly includes a tube 166 rotatably supported by a shaft 168 which is mounted at the opposite ends thereof to the tunnel 108. The shaft 168 supports the rollers 152 supporting an upper portion of the endless drive track 128. Upper ends of the rear suspension arms 164 are affixed to the tube 166 by welding for example, so that the rear suspension arms 164 are adapted to pivot about the shaft 168. The pivot points 304 and the shaft 168 define a pivot axis 305 (shown in FIG. 3) perpendicular to the longitudinal axis 109 of the tunnel 108. Lower ends of the rear suspension arms 164 are fixedly connected to a hollow cross bar 172. The hollow cross bar 172 is pivotally connected to left and right rocker arms 174 at left and right pivot points 306. The left and right pivot points 306 define a pivot axis 307 (shown in FIG. 3) perpendicular to the longitudinal axis 109 of the tunnel 108. It is contemplated that each of rear rocker arms 174 could be omitted and that each rear suspension arms 164 could be pivotally connected directly to the corresponding slide rail 146. Each of the left and right rear rocker arms 174 is pivotally attached at its lower end to a rear portion of each slide rail 146 at pivot point 319.

Figure 4:
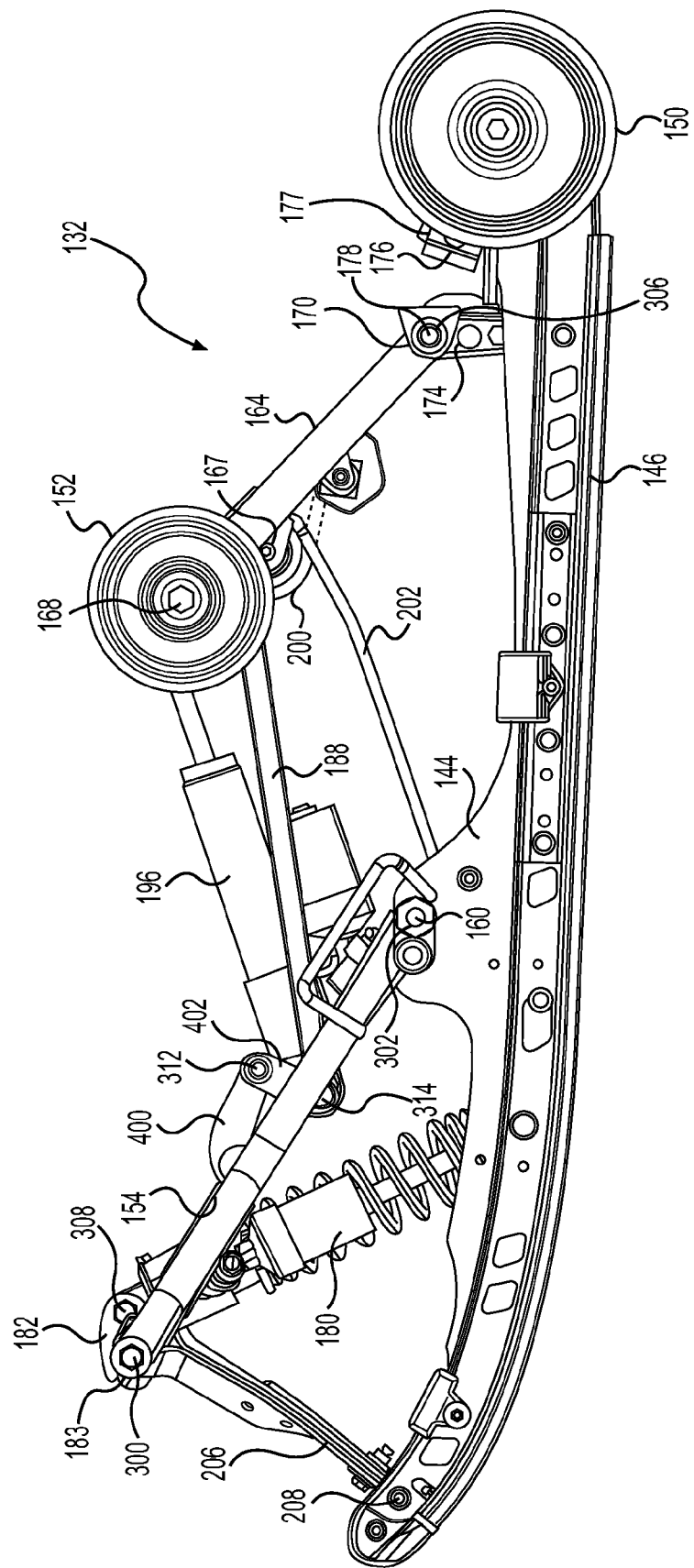
FIG. 4 is a left side elevation view of the suspension assembly of FIG. 2.

Left and right rear blocks 170 are attached to the opposite ends of the hollow cross bar 172. Left and right rear stoppers 176 are attached to their corresponding slide rails 146 at a position rearward of their corresponding left and right rear rocker arms 174 in order to limit the pivot movement of the corresponding left and right rear rocker arms 174 in the clockwise direction (as seen in FIG. 4). Each of the left and right rear stoppers 176 is mounted to a bracket 177 that is in turn mounted to the slide frame assembly 144. The left and right rear stoppers 176 could alternatively be the integral extensions of the slide frame assembly 144. The left and right blocks 170 are made of elastomer, such as rubber, polyurethane resin, Delrin™ or nylon. The left and right blocks 170 could alternatively be made of aluminum. In order to attenuate the impact loads generated when the left and right rear blocks 170 collide with the corresponding left and right rear stoppers 176, the rear stoppers 176 can be made of or coated with a resilient material such as rubber or a polymer. Such a resilient material used on the rear stoppers 176 also helps to reduce wear of the rear blocks 170. It is contemplated that the rear suspension assembly 132 could comprise left and right front stoppers disposed forwardly from each of the left and right rear rockers 174 to limit the pivot movement of the rear rocker arms 174 in the counterclockwise direction (as seen in FIG. 4).

The rear suspension arms 164 are coupled to the front suspension arms 154 such that, in operation, a motion of the rear portion 222 of the tunnel 108 can induce a related motion of the front portion 220 of the tunnel 108. Coupling is ensured by connecting a rear shock absorber 196 between the front suspension arms 154 and the rear suspension arms 164, as it will be described in greater details below. It is contemplated the coupling could be ensured differently.

A front shock absorber assembly 180 disposed between the tunnel 108 and the slide frame assembly 144 extends rearwardly and downwardly from the front portion 220 of the tunnel 108. The front shock absorber assembly 180 is disposed partially forward of the front suspension arms 154. A lower end of the first shock absorber assembly 180 is disposed forwardly of the lower ends of the front suspension arms 154. The front shock absorber assembly 180 is a damping unit which usually includes a hydraulic damper and a coil spring for absorbing the impact energy when impact forces are applied to the opposite ends of the damping unit. The coil spring biases the damping unit toward an extended position so that the hydraulic damper is in the best position to absorb the impact energies. Since shock absorber assemblies of the type of the shock absorber assembly 180 are well known in the art, it will not be further described herein.

The front shock absorber assembly 180 is operatively attached at an upper end thereof to the tunnel 108 by a shaft and front bracket assembly comprising a shaft 183 and two brackets 182. The shaft 183 is welded to the front suspension arms 154 and extends in an arcuate shape in between the front suspension arms 154. It is contemplated that the shaft 183 could not have an arcuate shape. The two brackets 182 are fixedly connected to the shaft 183 near a center of the shaft 183. The upper end of the front shock absorber assembly 180 is pivotally connected to the brackets 182 at pivot points 308 such that an axial force is applied to the upper end of the front shock absorber assembly 180 when the front suspension arms 154 move with respect to the tunnel 108. The pivot points 308 define a pivot axis 309 perpendicular to the longitudinal axis 109 of the tunnel 108. The front shock absorber assembly 180 is pivotally connected to a lower end thereof to the slide frame assembly 144 via a shaft 184. The shaft 184 is fixedly connected to the left and right slide rails 146, extending between them. The front shock absorber assembly 180 is adapted to rotate about the shaft 184. The shaft 184 defines a pivot axis 310.

The rear shock absorber 196 extends forwardly and downwardly from the rear portion 222 of the tunnel 108, and is disposed at least in part rearwardly of the front suspension arms 154. The rear shock absorber 196, similar to the hydraulic damper of front shock absorber assembly 180, is well known in the art, and therefore will not be described in detail. The rear shock absorber 196 is pivotally connected at its upper end to the tunnel 108 via a rear bracket 190 (shown in FIG. 2 and described below) mounted on the tube 166 and shaft 168 assembly of the rear suspension arms 164. The rear shock absorber 196 is connected at a lower end to the front suspension arms 154 via a pivot connection to left and right bracket arms 400 and the left and right links 402 (all described in greater details below).

The rear bracket 190 is fixedly connected to the tube 166. As mentioned above, the tube 166 is rotatable over the shaft 168. The rear bracket 190 comprises two pins 192, 198 diametrically opposite to each other. It is contemplated that the rear bracket 190 could be two rear brackets, each rear bracket comprising one of the pins 192, 198. The pin 192 is pivotally connected to the upper ends of the tie rods 188 at pivot point 317. The pin 198 pivotally connects the rear bracket 190 to the upper end of the rear shock absorber 196 at pivot point 311.

The tie rods 188 are left and right tie rods 188 disposed on each side of the rear shock absorber 196. A lower end of each of the left and right tie rods 188 is pivotally connected to a corresponding one of the left and right links 402. An upper end of each of the left and right tie rods 188 is pivotally connected to the pin 192 of the rear bracket 190. It is contemplated that two pins 192 could be used to receive the upper ends of the left and right tie rods 188.

Upon motion of the rear suspension arms 164, the two pins 192, 198 rotate with the tube 166 about the shaft 168 thereby actuating the rear shock absorber 196 and moving the left and right tie rods 188. The shock absorber 196, the tie rods 188 and the links 402 form an assembly through which the pivot movement of the rear suspension arms 164 about the shaft 168 and relative to the tunnel 108 of the chassis 106 forces the left and right bracket arms 400 to act on the front suspension arms 154 thereby applying a force to the front portion 220 of the tunnel 108, and thereby actuating the front shock absorber assembly 180.

The left and right bracket arms 400 have upper ends fixedly connected to a shaft 401, and are disposed adjacent to each other, near a center of the shaft 401. The shaft 401 is fixedly connected, by welding for example, to the front suspension arms 154 at a location between the pivot axes 301 and 303. Second ends of the left and right bracket arms 400 are pivotally connected to first ends of corresponding left and right links 402 at pivot points 312. The pivot points 312 define a pivot axis 313 (shown in FIG. 5) perpendicular to the longitudinal axis 109 of the tunnel 108. Second ends of the left and right links 402 are pivotally connected to a corresponding one of the tie rods 188 at pivot points 314. The pivot points 314 define a pivot axis 315 (shown in FIG. 5) perpendicular to the longitudinal axis 109 of the tunnel 108. It is contemplated that the left and right links 402 could form a single link.

Figure 5:
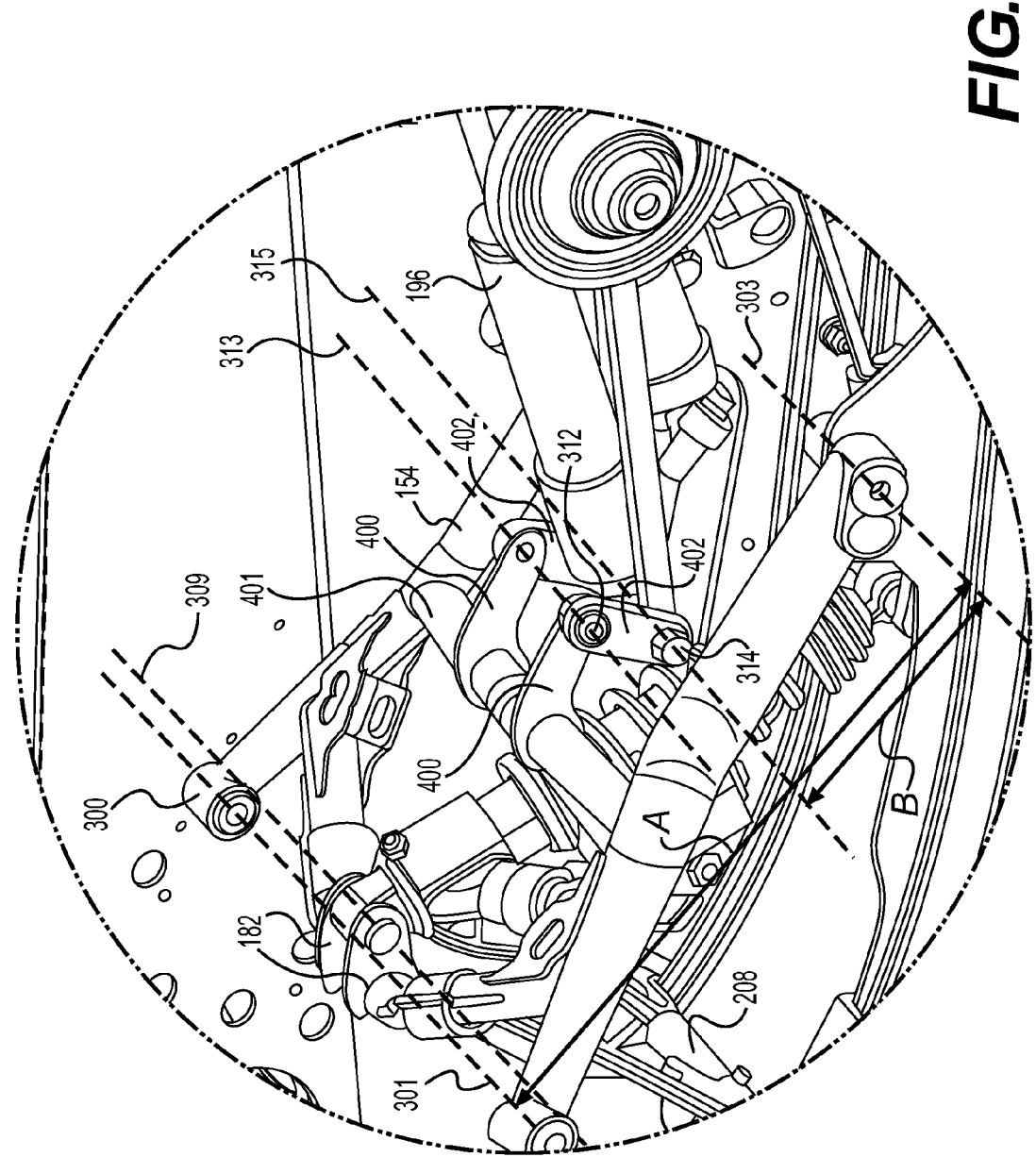
FIG. 5 is a close-up view of the circled portion of the suspension assembly of FIG. 2.

As best seen in FIG. 5, the position and dimension of the left and right bracket arms 400 and the left and right links 402 are such that a distance B between the pivot axes 315 and 303 is at least A/3, when A is a distance between the pivot axes 301 and 303 computed when the snowmobile 100 is in a neutral position. The neutral position is a position of the snowmobile 100 when the snowmobile 100 is at rest without load applied thereon (such as the weight of a driver or luggage).

Left and right torsion springs 200 are provided in order to push the slide frame assembly 144 apart from the tunnel 108 of the chassis 106, and to maintain the front and rear shock absorber assemblies 180, 196 substantially in extended condition when no substantial loads are applied thereon. The left and right torsion springs 200 surround an intermediate shaft 167 and are positioned at each end thereof. A first free end 201 (seen in FIG. 3) of each of the torsion springs 200 is abutting a second intermediate shaft 169, and a free second end 202 thereof is abutting the slide frame assembly 144, under a preloaded condition so that a predetermined torsion of force is applied to the rear suspension arms 164, tending to pivot the rear suspension arms 164 about the shaft 168 away from the tunnel 108 of the chassis 106. It is contemplated that only one torsion spring could be used.

Left and right flexible tension straps 206 are attached at their upper ends to the shaft 183, and are attached at their lower ends to the slide frame assembly 144 by means of a cross bar 208 which extends between and is attached at its opposite ends to the front ends of the slide rails 146. The flexible tension straps 206 prevent the slide frame assembly 144 from being pushed too far away from the tunnel 108.

Figure 6:
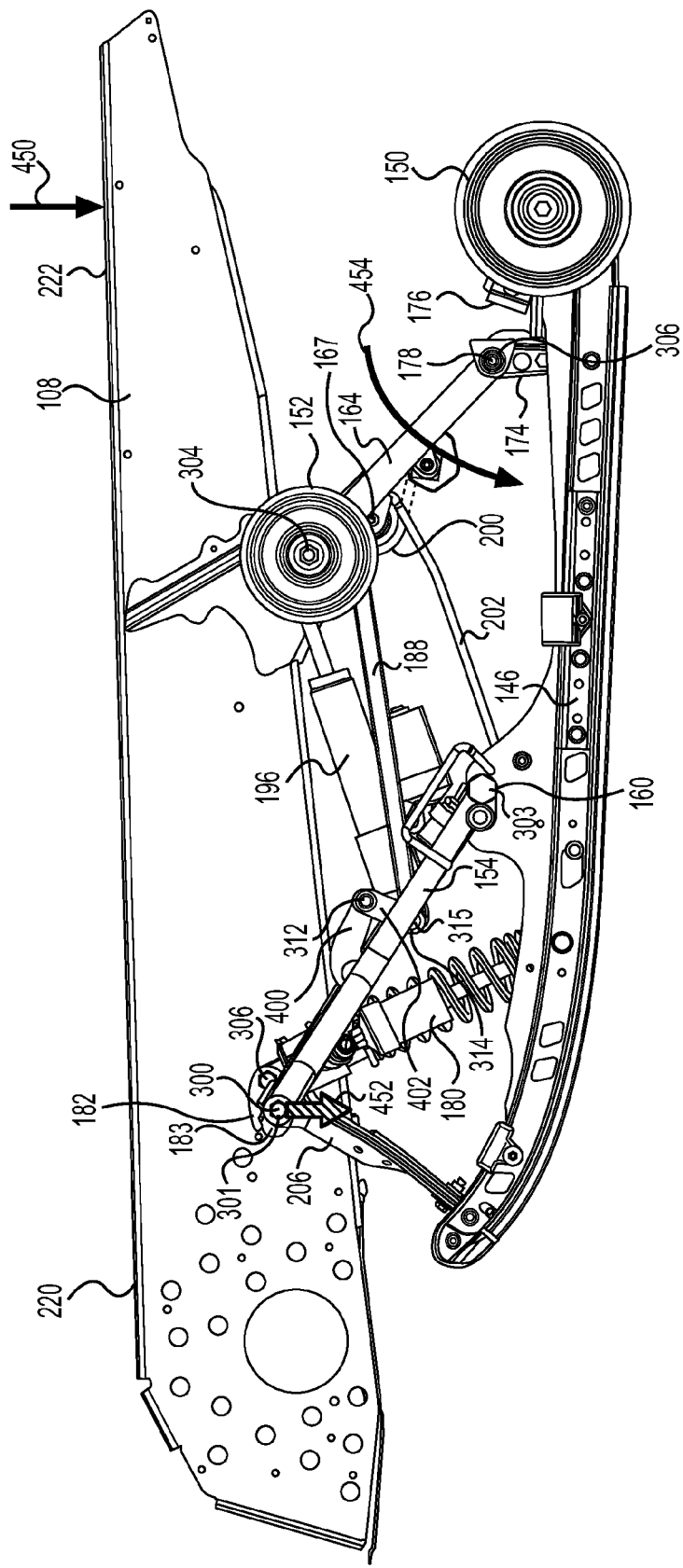
FIG. 6 is a left side elevation view of the suspension assembly of FIG. 2 experiencing an acceleration of the snowmobile with a tunnel cut away for clarity.
Figure 7:
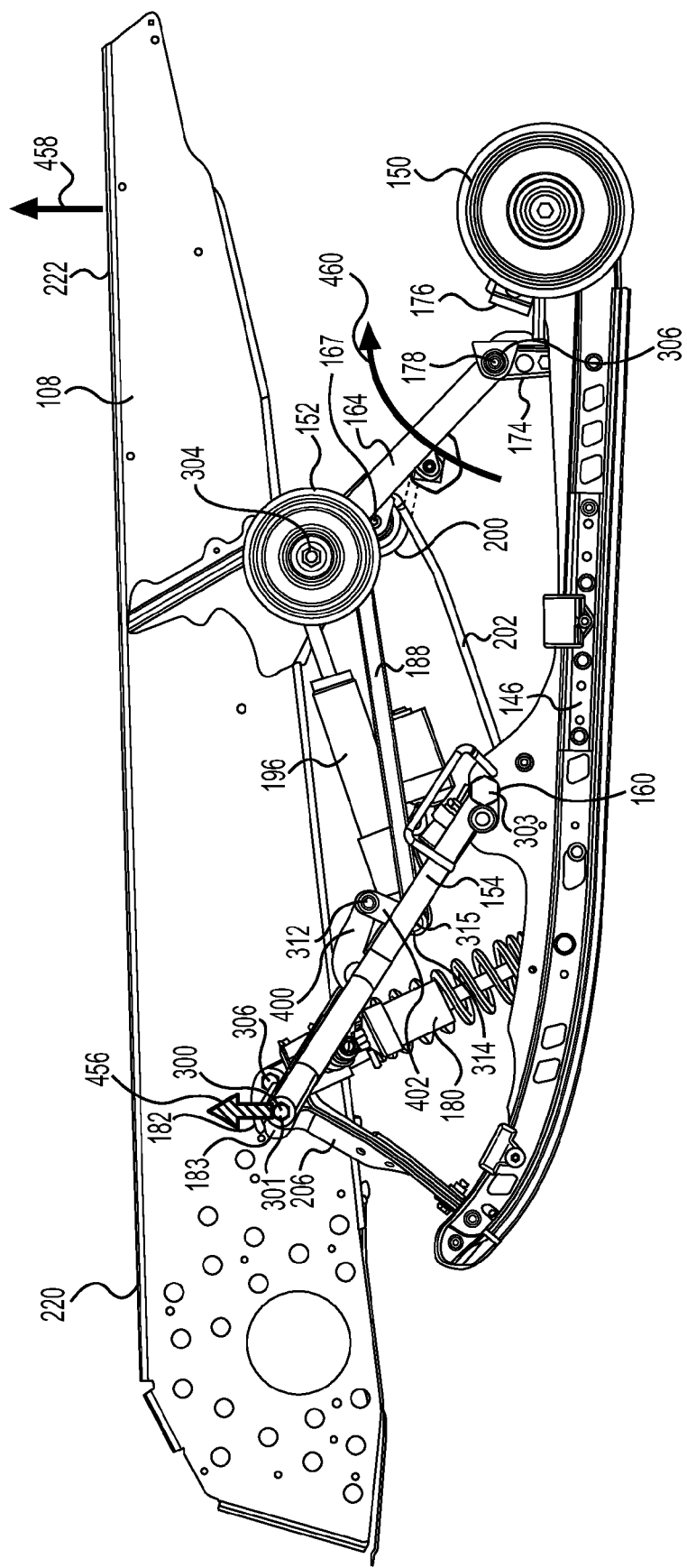
FIG. 7 is a left side elevation view of the suspension assembly of FIG. 2 experiencing a deceleration of the snowmobile with a tunnel and some portions of the suspension assembly cut away for clarity.

Turning now to FIGS. 6 and 7, operation of the rear suspension assembly 132 will be described.

FIG. 6 shows an arcuate solid arrow 454 indicating motion of the rear suspension arms 164 and a straight solid arrow 450 showing movement of the rear portion 222 of the tunnel 108 when the snowmobile 100 experiences acceleration with reference to the neutral position. When a snowmobile experiences acceleration, weight is transferred toward the rear end of the snowmobile resulting in a downward movement of the rear portion of the tunnel. This weight transfer would normally result in an upward movement of the front portion of the tunnel, which can be sometimes undesirable due to the reduction of weight on the front skis. However, the rear suspension assembly 132 of the present invention is designed to counteract this upward movement.

The rear suspension assembly 132 counteracts weight transfer by creating a force that opposes the upward movement of the front portion 220 of the tunnel 108. The weight transfer induces the rear suspension arms 164 to rotate toward the slide rails 146 (illustrated by the counterclockwise oriented arcuate solid arrow 454). The motion of the rear suspension arms 164 in turn compresses the rear shock absorber 196. Forces are transferred to the left and right links 402 via the rear shock absorber 196. This results in downward vertical forces 452 (only one of which is shown, illustrated by hatched arrow 452) acting on pivot points 300 where the front suspension arms 154 connect to the tunnel 108. The downward forces 452 induce a rotation of the front suspension arms 164 about the pivot axis 303 thus pulling the front portion 220 of the tunnel 108 toward the slide rails 146 and helping the tunnel 108 to keep a generally horizontal, or neutral orientation. Inducing movement of the tunnel 108 toward the slide rails 146 also induces the compression of the front shock absorber 180.

FIG. 7 shows an arcuate solid arrow 460 indicating motion of the rear suspension arms 164 and a straight solid arrow 458 showing movement of the rear portion 222 of the snowmobile 100 when the snowmobile 100 experiences decelerating with reference to the neutral position. When a snowmobile experiences deceleration, weight is transferred toward the front end of the snowmobile which results in a downward movement of the front portion of the tunnel. This will normally result in an upward movement of the rear portion of the tunnel, which can be sometimes undesirable do to the reduction of weight supported by the track which provides friction to slow down the snowmobile. However, the rear suspension assembly 132 of the present invention is designed to counteract this upward movement.

The rear suspension assembly 132 counteracts weight transfer by creating a force that opposes the movement of the front portion 220 of the tunnel 108. In contrast to acceleration, the weight transfer induced by deceleration causes a rotation of the rear suspension arms 164 away from the slide rails 146 (illustrated by the clockwise oriented solid arcuate arrow 460). The rear shock absorber 196 thus extends and the force is transferred to the left and right links 402 via the rear shock absorber 196. This results in upward forces (illustrated by hatched arrow 456, only one of which being shown) acting on pivot points 300 where the front suspension arms 154 connect to the tunnel 108. The upward forces 456 force the front suspension arms 154 to rotate about the pivot axis 303, thus pushing the front portion 220 of the tunnel 108 away from the slide rails 146 and helping the tunnel 108 to keep a generally horizontal or neutral orientation.

Figure 8:
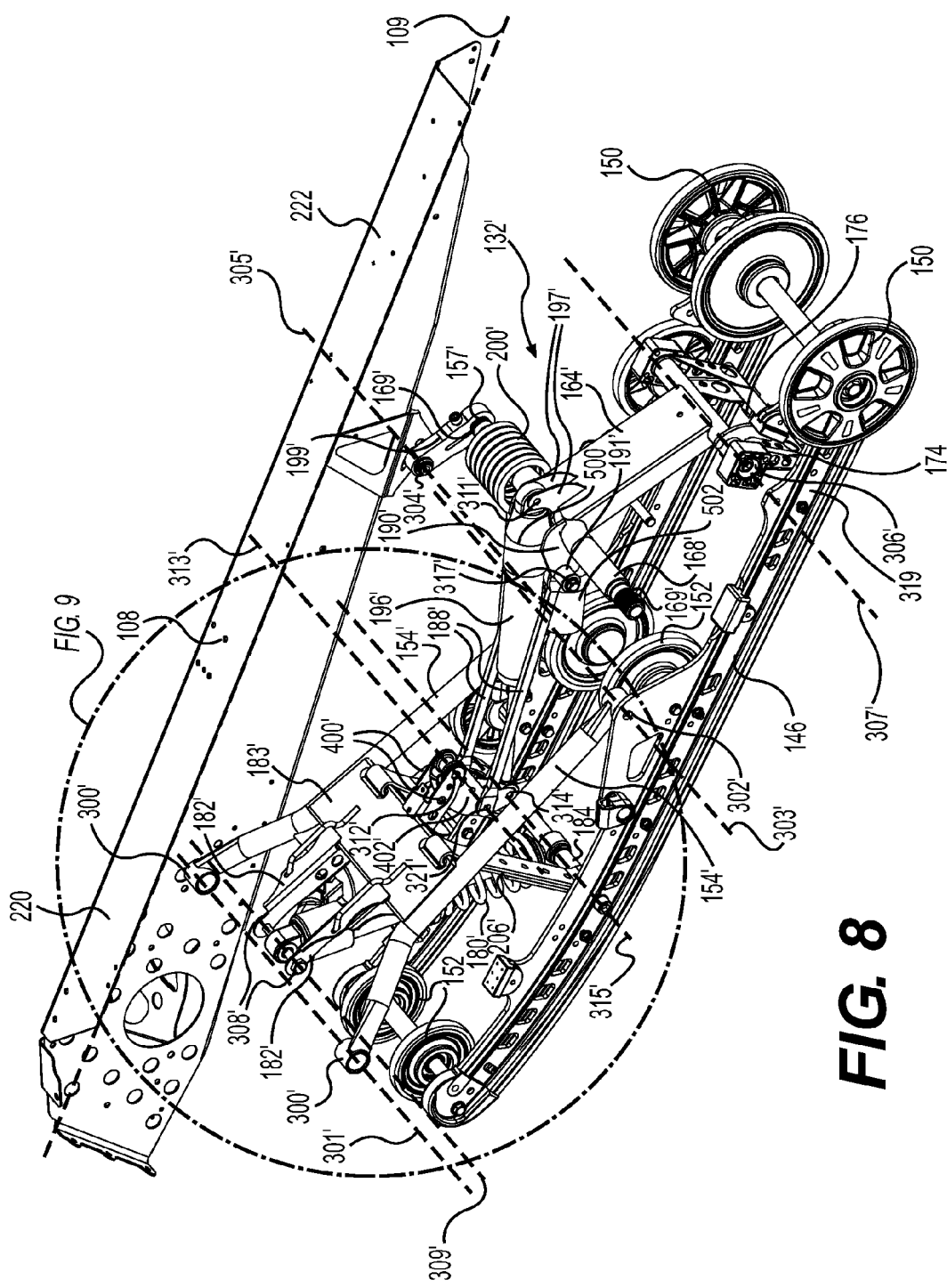
FIG. 8 is a perspective view taken from a rear, left side of a suspension assembly according to a second embodiment of the invention shown with some elements removed and the tunnel partially cut away for clarity
Figure 9:
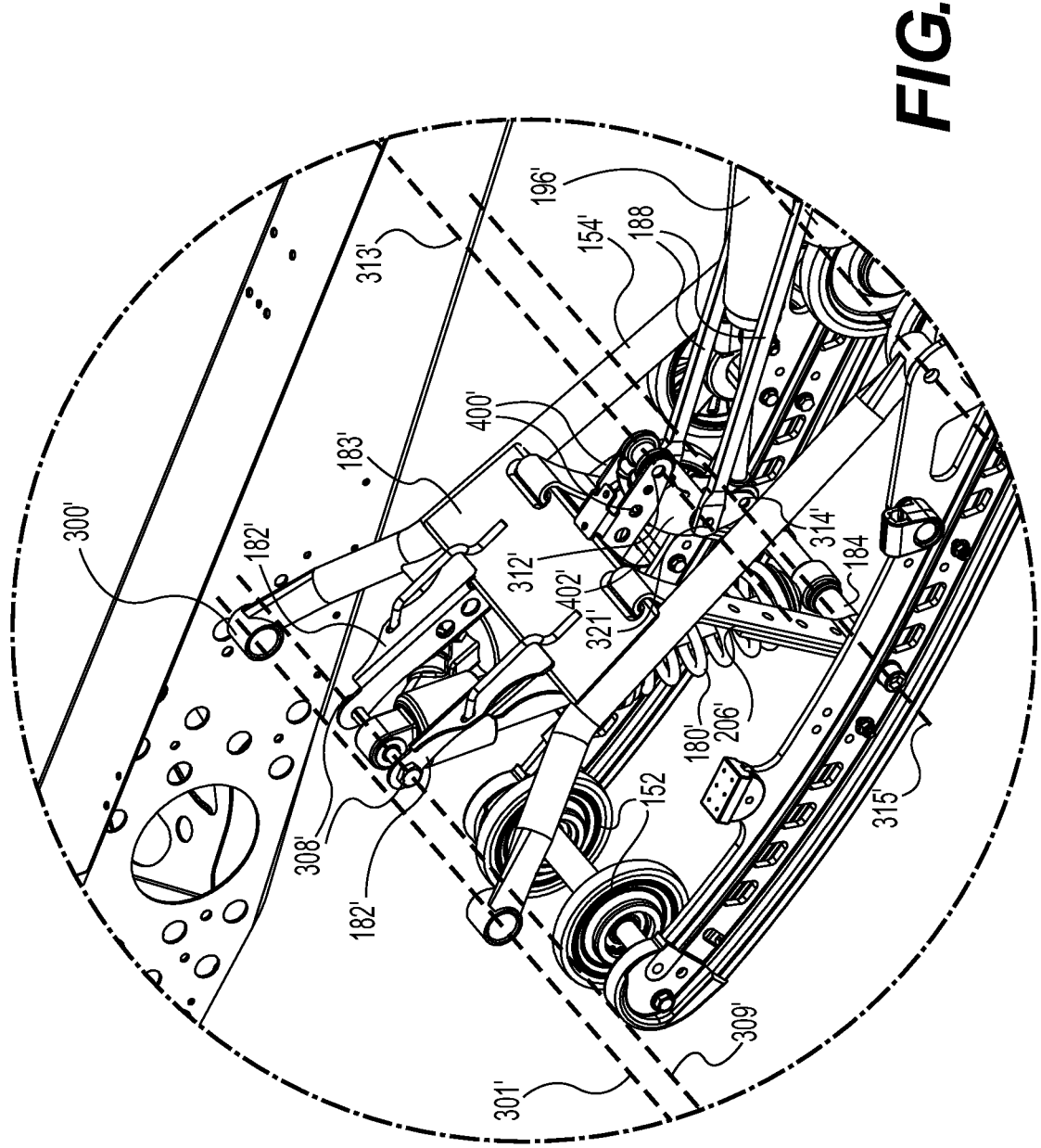
FIG. 9 is a close-up view of the circled portion of the suspension assembly of FIG. 8.
Figure 10:
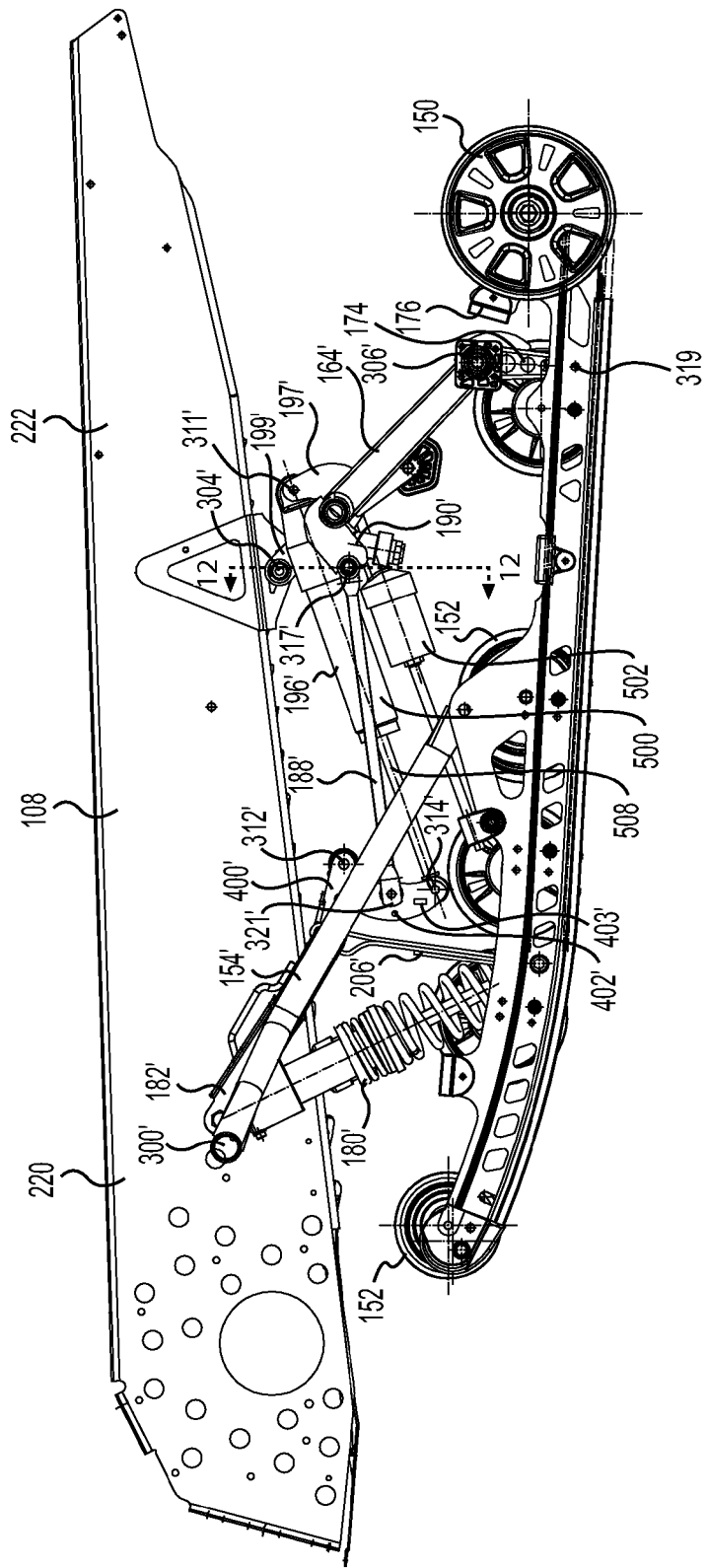
FIG. 10 is a left side elevation view of the suspension assembly of FIG. 8.

Referring to FIGS. 8 to 10, a rear suspension assembly 132' according to a second embodiment of the invention will now be described in greater details. For ease of understanding, elements of the rear suspension assembly 132' similar to the rear suspension assembly 132 will have the same reference numeral followed by a prime sign.

The rear suspension assembly 132' comprises left and right front suspension arms 154' and a single rear suspension arm 164'. It is contemplated that the rear suspension assembly 132' could comprise a pair of rear suspension arms 164'.

The front suspension arms 154' extend downwardly and rearwardly from the front portion 220 of the tunnel 108. Upper ends of the front suspension arms 154 are pivotally attached to the tunnel 108 at pivot points 300' to form a pivot axis 301' that is perpendicular to the longitudinal axis 109 of the tunnel 108. Lower ends of the front suspension arms 154' are each pivotally attached to their respective slide rails 146 of the slide frame assembly 144 at pivot point 302'. Left and right pivot points 302' define a pivot axis 303' perpendicular to the longitudinal axis 109 of the tunnel 108. The movement of the front portions of the slide rails 146 relative to the tunnel 108 of the chassis 106 causes the front suspension arms 154' to rotate about the axis 301', relative to the tunnel 108. The front suspension arms 154' are made of metal tubes having a generally circular cross-section. It is contemplated that the front suspension arms 154' could have other cross-sections, and that the front suspension arms 154' could be of another material than metal.

The rear suspension arm 164' extends downwardly and rearwardly from the rear portion 222 of the tunnel 108, and is disposed rearward of the front suspension arms 154'. The rear suspension arm 164' is a metal piece having a general rectangular cross-section. It is contemplated that the rear suspension arm 164' could have other shapes of cross-section, and that the rear suspension arm 164' could be of another material than metal. An upper end of the rear suspension arm 164' is pivotally connected to the tunnel 108 via a combination of a fixed connection to a shaft 168' and a pivot connection to two links 199' (only the left one being shown) as described below. It is contemplated that the upper ends of the rear suspension arm 164' could instead be connected to a tube and shaft assembly similar to the rear suspension arms 164. The shaft 168' has splined ends 169' which fixedly connect to second ends of the links 199' at points 157'. First ends of the links 199' are pivotally connected to the tunnel 108 at pivot points 304'. The pivot points 304' define a pivot axis 305' perpendicular to the longitudinal axis 109 of the tunnel 108.

A lower end of the rear suspension arm 164' is fixedly connected to the hollow cross bar 172. The hollow cross bar 172 is pivotally connected to the left and right rocker arms 174 at left and right pivot points 306'. The left and right pivot points 306' define a pivot axis 307' perpendicular to the longitudinal axis 109 of the tunnel 108.

The rear suspension arm 164' is coupled to the front suspension arms 154' by connecting a rear shock absorber 196' between the front suspension arms 154' and the rear suspension arm 164', as it will be described in greater details below. It is contemplated the coupling could be ensured differently.

A front shock absorber assembly 180' disposed between the tunnel 108 and the slide frame assembly 144 extends rearwardly and downwardly from the front portion 220 of the tunnel 108. The front shock absorber assembly 180' is disposed partially forward of the front suspension arms 154'. A lower end of the first shock absorber assembly 180' is disposed forwardly of lower ends of the front suspension arms 154'. The front shock absorber assembly 180' is similar to the shock absorber assembly 180 and will therefore not be described again.

The front shock absorber assembly 180' is operatively attached at an upper end thereof to a front bracket assembly comprising a plate 183' and two brackets 182'. The plate 183' is welded to the front suspension arms 154' and extends therebetween. It is contemplated that the plate 183' could not be a plate, and could be substituted by an actuate shaft similar to the shaft 183. The two brackets 182' are fixedly connected to the plate 183' near a center of the plate 183'. The upper end of the front shock absorber assembly 180' is pivotally connected to the brackets 182' at pivot points 308' such that an axial force is applied to the upper end of the front shock absorber assembly 180' when the front suspension arms 154' move with respect to the tunnel 108. The pivot points 308' define a pivot axis 309' perpendicular to the longitudinal axis 109 of the tunnel 108. The front shock absorber assembly 180' is pivotally connected to a lower end thereof to the slide frame assembly 144 via the shaft 184. The front shock absorber assembly 180' is adapted to rotate about the shaft 184, which defines the pivot axis 315'.

The rear shock absorber 196' extends forwardly and downwardly from the rear portion 222 of the tunnel 108, and is disposed at least in part rearwardly of the front suspension arms 154'. The rear shock absorber 196' is similar to the rear shock absorber assembly 180' and will be described in greater detail below with respect to FIG. 13. The rear shock absorber 196' is connected at a lower end to the front suspension arms 154' via a pivot connection to left and right bracket arms 400' and the left and right links 402' (all described in greater details below). The rear shock absorber 196' is pivotally connected at its upper end to two brackets 197'. The brackets 197' are fixedly connected partially to the shaft 168' and partially to the rectangular tube forming the rear suspension arm 164'. It is contemplated that the rear bracket 197' could be fixedly connected fully to the shaft 168' or fully to the rectangular tube forming the rear suspension arm 164'.

Figure 13:
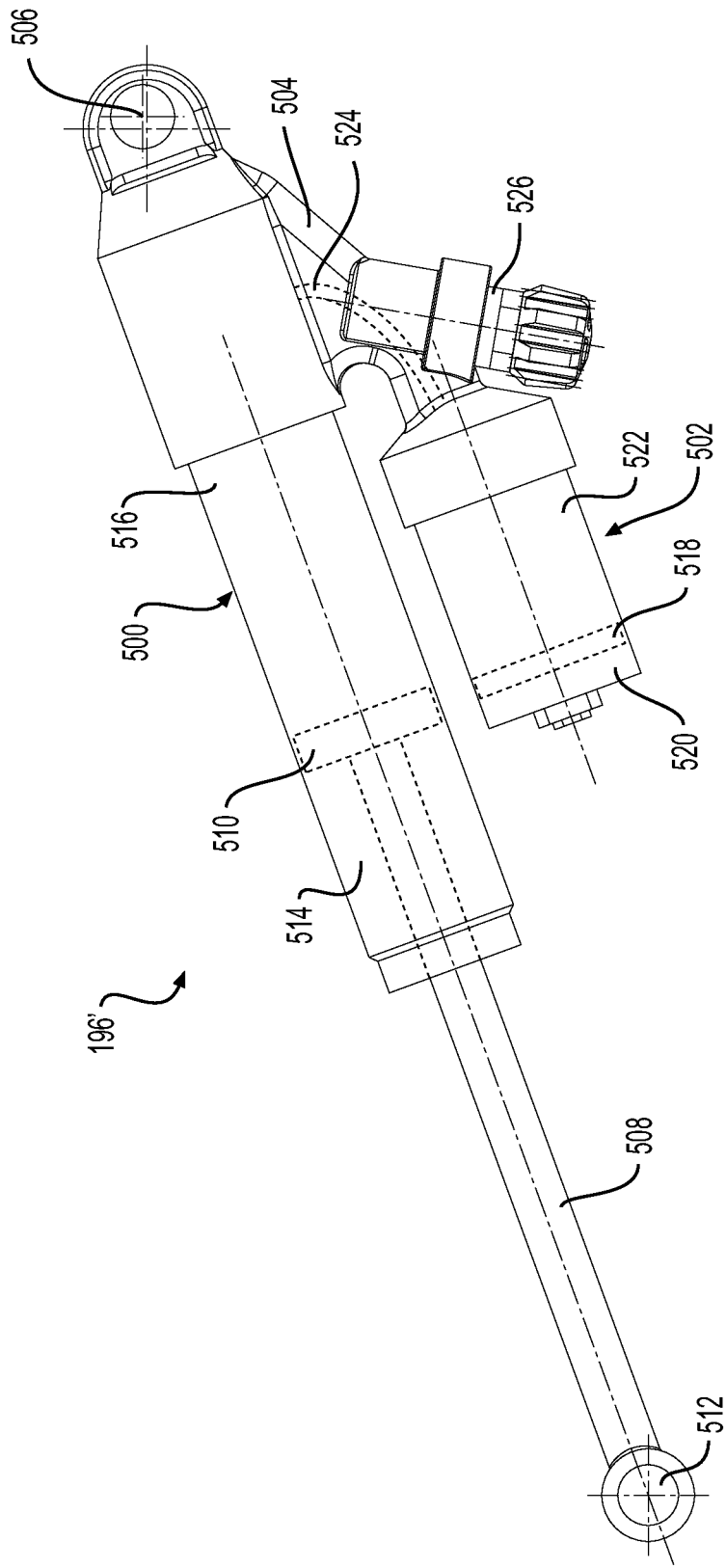
FIG. 13 is a side elevation view of a rear shock absorber of the suspension assembly of FIG. 8.

As can be seen in FIG. 13, the rear shock absorber 196' includes a shock absorber body 500 having a piggy-back chamber 502 connected thereto by a connecting member 504. As can be seen, the piggy-back chamber 502 is disposed below the shock absorber body 500. It is contemplated that the piggy-back chamber 502 could be disposed above or to one side of the shock absorber body 500. The shock absorber body 500 defines an aperture 506 used to connect the shock absorber 196' to the two brackets 197'. The rear shock absorber 196' also includes a rod 508 connected to a piston 510 (shown in phantom) disposed inside the shock absorber body 500. The rod 508 defines an aperture 512 used to connect the shock absorber 196' to the links 402'. The piston 510 separates the interior of the shock absorber body 500 into two variable volume chambers 514, 516 that are each filled with hydraulic fluid. As will be described below, hydraulic fluid can flow from one chamber 514 or 516 to the other. The piggy-back chamber 502 has a piston 518 (shown in phantom) disposed therein that separates the interior of the piggy-back chamber 502 into a variable volume gas chamber 520 that is filled with a compressible gas and a variable volume hydraulic fluid chamber 522 that is filled with hydraulic fluid. The piston 518 is provided with seals (not shown) or other means to prevent the flow of gas/fluid between the chamber 520, 522. A passage 524 (shown in phantom) defined inside the connecting member 504 fluidly communicates the chamber 516 with the chamber 522. A valve assembly 526 mounted onto the connecting member 504 can be manually adjusted to control a flow of hydraulic fluid through the passage 524. It is contemplated that the passage 524 could be omitted and be replaced by a hose fluidly communicating the chamber 516 with the chamber 522 via apertures formed in the shock absorber body 502 and the piggy-back chamber 504.

As the rear shock absorber 196' is compressed, the piston 510 and rod 508 moves toward the upper end of the rear shock absorber 196'. As a result, hydraulic fluid flows from the chamber 516 to the chamber 514 by passing around and/or through the piston 510 (depending on the configuration or the piston 510). The rate at which hydraulic fluid can flow from the chamber 516 to the chamber 514 defines in part a damping characteristic of the rear shock absorber 196'. As would be understood, as more of the rod 508 enters the shock absorber body 500, it displaces hydraulic fluid. The volume of displaced hydraulic fluid flows into the piggy-back chamber 502 via the passage 524. As a result, the piston 518 moves so as to increase the volume of the chamber 522 and to decrease the volume of the chamber 520 by compressing the gas therein. The rate at which hydraulic fluid can flow from the shock absorber body 500 to the piggy-back chamber 502 also defines in part the damping characteristic of the rear shock absorber 196'. Therefore, by adjusting the valve assembly 526, the damping characteristic of the rear shock absorber 196' can be adjusted.

As the rear shock absorber 196' is expanded, the piston 510 and rod 508 moves toward the lower end of the rear shock absorber 196'. As a result, hydraulic fluid flows from the chamber 514 to the chamber 516 by passing around and/or through the piston 510 (depending on the configuration or the piston 510). It is contemplated that the rate at which hydraulic fluid can flow from the chamber 514 to the chamber 516 could differ from the rate at which hydraulic fluid can flow from the chamber 516 to the chamber 514. As more of the rod 508 exits the shock absorber body 500, it provides room for additional hydraulic fluid to enter the shock absorber body 500. As a result, hydraulic fluid flows into the shock absorber body 500 from the piggy-back chamber 502 via the passage 524. As a result, the piston 518 moves so as to decrease the volume of the chamber 522 and to increase the volume of the chamber 520.

Figure 12:
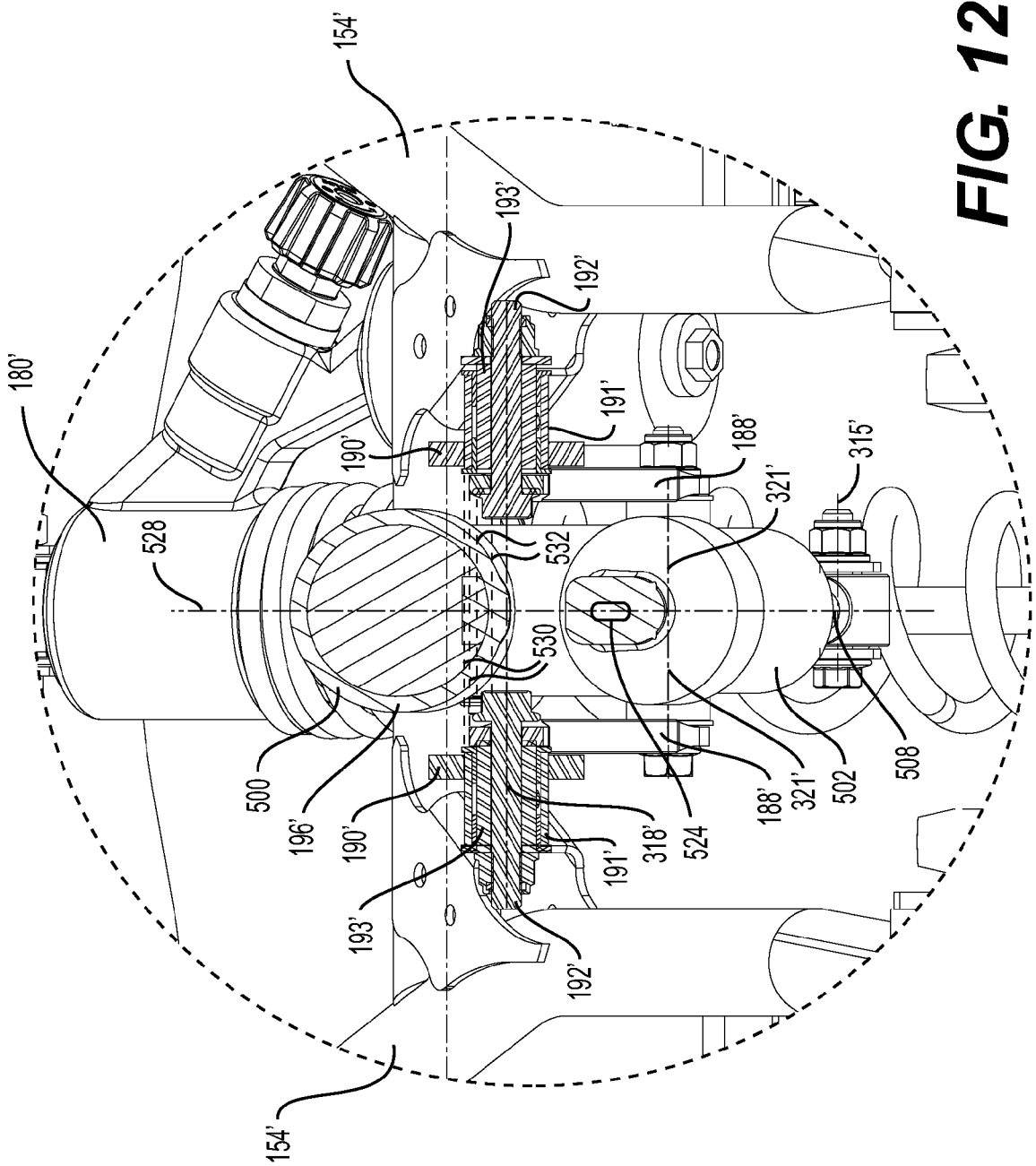
FIG. 12 is a vertical cross-section of a portion of the suspension assembly of FIG. 8 taken through line 12-12 of FIG. 10.

Left and right tie rods 188' are disposed on left and right sides respectively of the rear shock absorber 196'. Upper ends of the tie rods 188' are pivotally connected to left and right brackets 190' at pivot points 317'. By connecting the tie rods 188' to the brackets 190' as shown allows the shock absorber 196' to travel between the tie rods 188' and therefore allows for a greater amount of travel of the suspension 132'. The pivot points 317' define a pivot axis 318' perpendicular to the longitudinal axis 109 of the tunnel 108. The brackets 190' are fixedly connected to the shaft 168'. The brackets 190' are disposed on the shaft 168' at an angle with respect to the brackets 197'. As can be seen in FIG. 12, the left and right brackets 190' include left and right bushing holders 191' respectively. Left and right bushings 193' are disposed inside the left and right bushing holders 191'. Left and right fasteners 192' pass through their respective tie rods 188' and bushings 193' to connect the tie rods 188' to the brackets 190'. Lower ends of the tie rods 188' are pivotally connected to the links 402' as will be described below.

The left and right bracket arms 400' have upper ends fixedly connected to the plate 183', and are disposed adjacent to each other, near a center of the plate 183'. Second ends of the left and right bracket arms 400' are pivotally connected to first ends of corresponding left and right links 402' at pivot points 312'. The pivot points 312' define a pivot axis 313' perpendicular to the longitudinal axis 109 of the tunnel 108. Second ends of the left and right links 402' are pivotally connected to the lower end of the rear shock absorber 196' at pivot points 314' or 403'. The pivot points 314' define a pivot axis 315' perpendicular to the longitudinal axis 109 of the tunnel 108. Contrarily to the first embodiment, the second ends of the left and right links 402' are not pivotally connected to corresponding left and right tie rods 188'. Instead, the left and right tie rods 188' connect to a middle of a corresponding link 402' at pivot points 321' or 403'. As a consequence, a pivot axis of the lower end of the shock absorber 196' is different from a pivot axis of the lower end of the tie rods 188'. Pivot point 403' enables the suspension characteristics to be modified to adjust to personal preference. It is contemplated that the points 321', 314' and 403' could be curved slots instead of individual points to allow for many easily-adjustable different positions of the lower ends of the tie rods 188' or shock absorber 196'.

Similarly to the first embodiment, the position and dimension of the left and right bracket arms 400' and the left and right links 402' are such that a distance B between the pivot axes 315' and 303' is at least A/3, when A is a distance computed at the neutral position between the pivot axes 301' and 303'.

Left and right torsion springs 200' (only the right one being shown in FIG. 8) are provided in order to push the slide frame assembly 144 apart from the tunnel 108 of the chassis 106, and to maintain the front and rear shock absorber assemblies 180', 196' substantially in extended condition when no substantial loads are applied thereon. The left and right torsion springs 200' surround the shaft 168' and are positioned on each side of the rear suspension arm 164'. A first free end (not shown) of each of the torsion springs 200 is abutting the shaft 168', and a free second end (not shown) thereof is abutting the slide frame assembly 144, under a preloaded condition so that a predetermined torsion of force is applied to the rear suspension arm 164', tending to pivot the rear suspension arm 164' about the links 199' away from the tunnel 108 of the chassis 106. It is contemplated that only one torsion spring could be used.

Left and right flexible tensions straps 206', similar to the flexible straps 206, are attached at their upper ends to the plate 183', and at their lower ends to the slide frame assembly 144 by means of the shaft 184.

Operation of the rear suspension assembly 132' is substantially similar to the operation of the rear suspension assembly 132 except for the absence of the rotation at the tube 166 and shaft 168 that has been substituted by the link 199' pivoting with respect to the tunnel 108. Upon motion of the rear suspension arm 164', the rear shock absorber 196' is actuated and the left and right tie rods 188' move. The links 199', the rear shock absorber 196', the tie rods 188' and the links 402' form an assembly through which the pivotal movement of the links 199' (and therefore the rear suspension arm 164') about the pivot axis 305' and relative to the tunnel 108 of the chassis 106, forces the left and right bracket arms 400' to act on the front suspension arms 154' thereby applying a force to the front portion 220 of the tunnel 108, and thereby actuating the front shock absorber assembly 180'.

Figure 11:
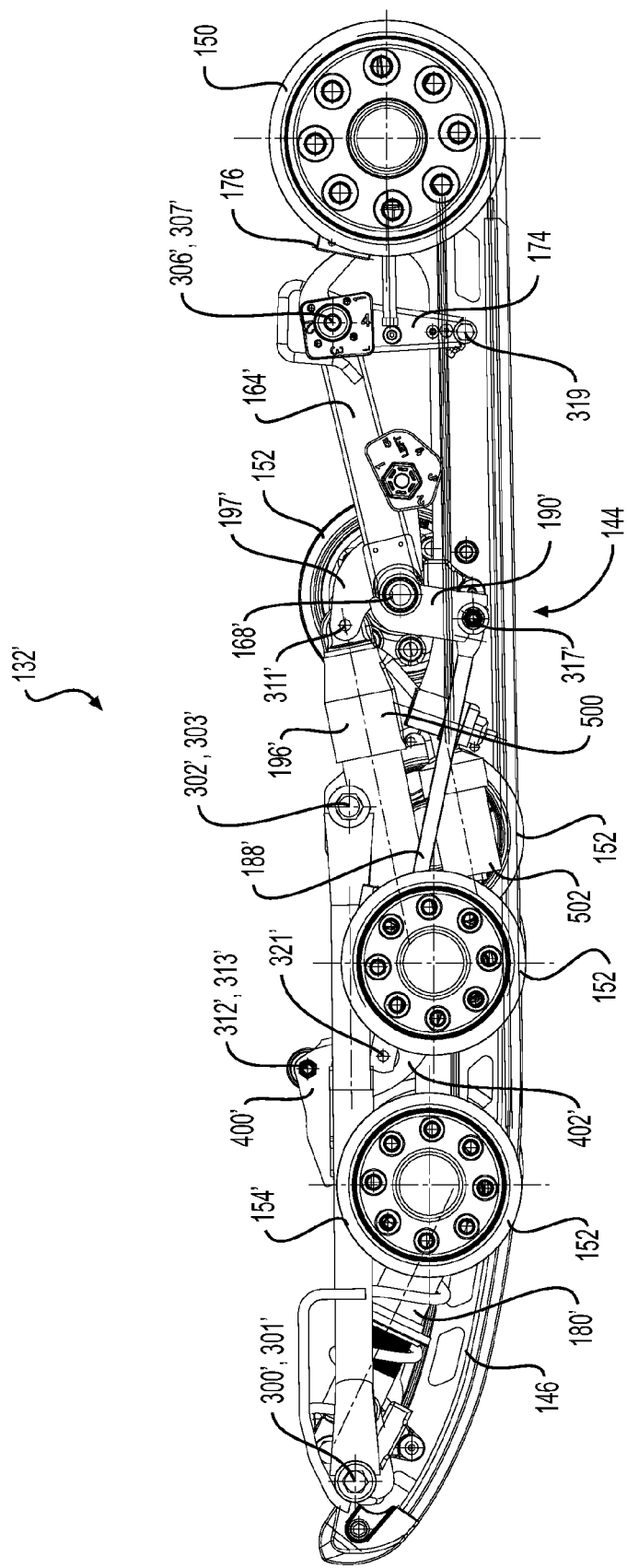
FIG. 11 is a left side elevation view of the suspension assembly of FIG. 8 shown compressed with the tunnel and some portions of the suspension assembly removed for clarity.

As can be seen in FIGS. 10 to 12, by having the rear shock absorber 196' arranged between the tie rods 188' as shown, in some positions of the rear suspension assembly 132' the pivot axis 318' of the upper ends of the tie rods 188' is disposed above a portion of the rear shock absorber 196', as in the position shown in FIG. 10, and in other positions the pivot axis 318' is disposed below the rear shock absorber 196', as in the position shown in FIG. 11. As can be seen in FIG. 12, when the suspension assembly 132' is in the position shown in FIG. 10, the axis 318' intersects the shock absorber 196'. More specifically, the axis 318' intersects the connecting member 504 of the rear shock absorber 196'. Depending on the degree of compression of the rear suspension assembly 132', there are other positions where the axis 318' intersects other portions of the rear shock absorber body 196'.

As can also be seen in FIG. 12, when the suspension assembly 132' is in the position shown in FIG. 10, a projection of the left bushing holder 191' onto the vertical plane 528 has a portion (the portion between the lines 530 with the portions forward and rearward thereof) that overlaps a portion of the rear shock absorber 196', which in this case is the shock absorber body 500. The same is true for a projection of the right bushing holder 191'. The vertical plane 528 is a vertical plane that passes through a lateral center of the rear shock absorber 196, which in the present embodiment corresponds to lateral centers of the snowmobile 100 and of the rear suspension assembly 132'. Depending on the degree of compression of the rear suspension assembly 132', there are other positions where the projections of the holders 191' onto the vertical plane 528 have portions thereof (the same or different portions than those indicated above) that overlap other portions of the rear shock absorber 196'.

As can also be seen in FIG. 12, when the suspension assembly 132' is in the position shown in FIG. 10, a projection of the left bushing 193' onto the vertical plane 528 has a portion (the portion between the lines 532 with the portions forward and rearward thereof) that overlaps a portion of the rear shock absorber 196', which in this case is the shock absorber body 500. The same is true for a projection of the right bushing 193'. Depending on the degree of compression of the rear suspension assembly 132', there are other positions where the projections of the bushings 193' onto the vertical plane 528 have portions thereof (the same or different portions than those indicated above) that overlap other portions of the rear shock absorber 196'.

As the rear suspension assembly 132' gets compressed, the axis 138', the projections of the bushing holders 191' and the projections of the bushings 193' become spaced from the shock absorber body 500 and eventually the entire rear shock absorber 196' as in the position shown in FIG. 11.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A suspension system for a snowmobile having a chassis and an endless drive track, the suspension assembly comprising:
   a rail for engagement with the endless drive track;
   a first suspension arm having an upper end adapted for pivotally connecting to the chassis and a lower end pivotally connected to the rail, the first suspension arm extending forwardly and upwardly from the rail;
   a second suspension arm disposed rearwardly of the first suspension arm, the second suspension arm having an upper end adapted for pivotally connecting to the chassis and a lower end pivotally connected to the rail, the second suspension arm extending forwardly and upwardly from the rail;
   a first shock absorber having an upper end and a lower end, the upper end of the first shock absorber being pivotally connected to the first suspension arm, the lower end of the first shock absorber being pivotally connected to move with movement of the rail;
   a second shock absorber having an upper end and a lower end, the lower end of the second shock absorber being operatively pivotally connected to the rail, the upper end of the second shock absorber being pivotally connected to the second suspension arm;
   a left bracket connected to the second suspension arm, the left bracket being disposed on a left side of the second shock absorber;
   a right bracket connected to the second suspension arm, the right bracket being disposed on a right side of the second shock absorber;
   a left tie rod having a lower end and an upper end, the lower end of the left tie rod being operatively pivotally connected to the first suspension arm, and the upper end of the left tie rod being pivotally connected to the left bracket about a first pivot axis; and
   a right tie rod having a lower end and an upper end, the lower end of the right tie rod being operatively pivotally connected to the first suspension arm, and the upper end of the right tie rod being pivotally connected to the right bracket about the first pivot axis,
   the second shock absorber being disposed laterally between the left and right tie rods,
   the suspension being movable between a first position where the first pivot axis intersects the second shock absorber and a second position where the first pivot axis is spaced from the second shock absorber.

2. The suspension system of claim 1, wherein the lower end of the first shock absorber is disposed forwardly of the lower end of the first suspension arm; and
   the lower end of the second shock absorber is disposed rearwardly of the lower end of the first shock absorber.

3. The suspension system of claim 1, further comprising:
   a bracket arm having a first end and a second end, the first end of the bracket arm being fixedly connected to the first suspension arm between the upper end and the lower end of the first suspension arm; and
   a link having a first end and a second end, the first end of the link being pivotally connected to the second end of the bracket arm;
   wherein the lower end of the second shock absorber is pivotally connected to the second end of the link about a second pivot axis.

4. The suspension system of claim 3, wherein the first end of the link is pivotally connected to the second end of the bracket arm about a third pivot axis, the third pivot axis is above of the second pivot axis; and
   wherein the lower ends of the left and right tie rods are pivotally connected to the link about a fourth pivot axis intermediate the second and third pivot axes.

5. The suspension system of claim 1, wherein the lower end of the first shock absorber is pivotally connected to the rail.

6. The suspension assembly of claim 1, wherein the lower end of the second shock absorber is operatively pivotally connected to the first suspension arm.

7. The suspension system of claim 1, further comprising:
   a left fastener fastening the left tie rod to the left bracket; and
   a right fastener fastening the right tie rod to the right bracket.

8. The suspension system of claim 1, further comprising a gap defined between the left and right brackets along the first pivot axis, the gap being adapted to receive a portion of the second shock absorber.

9. The suspension system of claim 1, further comprising:
   a bracket arm having a first end and a second end, the first end of the bracket arm being fixedly connected to the first suspension arm between the upper end and the lower end of the first suspension arm; and
   a link having a first end and a second end, the first end of the link being pivotally connected to the second end of the bracket arm;
   wherein the lower end of the second shock absorber is pivotally connected to the second end of the link about a second pivot axis,
   wherein the first end of the link is pivotally connected to the second end of the bracket arm about a third pivot axis, the third pivot axis is above of the second pivot axis;
   wherein the lower ends of the left and right tie rods are pivotally connected to the link about a fourth pivot axis intermediate the second and third pivot axes; and
   wherein the lower end of the first suspension arm is pivotally connected to the rail about a fifth pivot axis, the second pivot axis being disposed below the first suspension arm and forward of the fifth pivot axis.

10. The suspension system of claim 9, wherein the second pivot axis is disposed forward of the fifth pivot axis.

11. A suspension system for a snowmobile having a chassis and an endless drive track, the suspension assembly comprising:
   a rail for engagement with the endless drive track;
   a first suspension arm having an upper end adapted for pivotally connecting to the chassis and a lower end pivotally connected to the rail, the first suspension arm extending forwardly and upwardly from the rail;
   a second suspension arm disposed rearwardly of the first suspension arm, the second suspension arm having an upper end adapted for pivotally connecting to the chassis and a lower end pivotally connected to the rail, the second suspension arm extending forwardly and upwardly from the rail;

a first shock absorber having an upper end and a lower end, the upper end of the first shock absorber being pivotally connected to the first suspension arm, the lower end of the first shock absorber being pivotally connected to move with movement of the rail;

a second shock absorber having an upper end and a lower end, the lower end of the second shock absorber being operatively pivotally connected to the rail, the upper end of the second shock absorber being pivotally connected to the second suspension arm;

a left bracket connected to the second suspension arm, the left bracket being disposed on a left side of the second shock absorber, the left bracket including a left holder;

a right bracket connected to the second suspension arm, the right bracket being disposed on a right side of the second shock absorber, the right bracket including a right holder;

a left tie rod having a lower end and an upper end, the lower end of the left tie rod being operatively pivotally connected to the first suspension arm, and the upper end of the left tie rod being pivotally connected to the left holder about a first pivot axis; and a right tie rod having a lower end and an upper end, the lower end of the right tie rod being operatively pivotally connected to the first suspension arm, and the upper end of the right tie rod being pivotally connected to the right holder about the first pivot axis, the second shock absorber being disposed laterally between the left and right tie rods, the suspension being movable between a first position and a second position, in the first position, at least portions of projections of the left and right holders onto a vertical plane overlap a portion of the second shock absorber, the vertical plane passing through a lateral center of the second shock absorber, in the second position, the projections of the left and right holders are spaced from the second shock absorber.

12. The suspension system of claim 11, wherein the second shock absorber includes a shock absorber body and a piggyback chamber connected to the shock absorber body; and wherein in the first position the at least portions of the projections of the left and right holders overlap a portion of the shock absorber body.

13. The suspension system of claim 11, wherein the left and right holders are left and right bushing holders;

the suspension system further comprising:
a left bushing disposed in the left bushing holder;
a left fastener passing through the left bushing and fastening the left tie rod to the left bushing holder;
a right bushing disposed in the right bushing holder; and
a right fastener passing through the right bushing and fastening the right tie rod to the right bushing holder.

14. The suspension system of claim 11, wherein the lower end of the first shock absorber is disposed forwardly of the lower end of the first suspension arm; and the lower end of the second shock absorber is disposed rearwardly of the lower end of the first shock absorber.

15. The suspension system of claim 11, further comprising:
a bracket arm having a first end and a second end, the first end of the bracket arm being fixedly connected to the first suspension arm between the upper end and the lower end of the first suspension arm; and
a link having a first end and a second end, the first end of the link being pivotally connected to the second end of the bracket arm;

wherein the lower end of the second shock absorber is pivotally connected to the second end of the link about a second pivot axis.

16. The suspension system of claim 15, wherein the first end of the link is pivotally connected to the second end of the bracket arm about a third pivot axis, the third pivot axis is above of the second pivot axis; and wherein the lower ends of the left and right tie rods are pivotally connected to the link about a fourth pivot axis intermediate the second and third pivot axes.

17. The suspension system of claim 11, wherein the lower end of the first shock absorber is pivotally connected to the rail.

18. The suspension assembly of claim 11, wherein the lower end of the second shock absorber is operatively pivotally connected to the first suspension arm.

19. The suspension system of claim 11, further comprising a gap defined between the left and right holders along the first pivot axis, the gap being adapted to receive a portion of the second shock absorber.

20. A suspension system for a snowmobile having a chassis and an endless drive track, the suspension assembly comprising:

a rail for engagement with the endless drive track;

a first suspension arm having an upper end adapted for pivotally connecting to the chassis and a lower end pivotally connected to the rail, the first suspension arm extending forwardly and upwardly from the rail;

a second suspension arm disposed rearwardly of the first suspension arm, the second suspension arm having an upper end adapted for pivotally connecting to the chassis and a lower end pivotally connected to the rail, the second suspension arm extending forwardly and upwardly from the rail;

a first shock absorber having an upper end and a lower end, the upper end of the first shock absorber being pivotally connected to the first suspension arm, the lower end of the first shock absorber being pivotally connected to move with movement of the rail;

a second shock absorber having an upper end and a lower end, the lower end of the second shock absorber being operatively pivotally connected to the rail, the upper end of the second shock absorber being pivotally connected to the second suspension arm;

a left bracket connected to the second suspension arm, the left bracket being disposed on a left side of the second shock absorber;

a right bracket connected to the second suspension arm, the right bracket being disposed on a right side of the second shock absorber;

a left tie rod having a lower end and an upper end, the lower end of the left tie rod being operatively pivotally connected to the first suspension arm, and the upper end of the left tie rod being pivotally connected to the left holder at a left pivot point; and a right tie rod having a lower end and an upper end, the lower end of the right tie rod being operatively pivotally connected to the first suspension arm, and the upper end of the right tie rod being pivotally connected to the right holder at a right pivot point, the second shock absorber being disposed laterally between the left and right tie rods, the suspension being movable between a first position and a second position, in the first position, an axis passing through the left and right pivot points intersects the second shock absorber, in the second position, the axis is spaced from the second shock absorber.

21. The suspension system of claim 20, further comprising a gap defined between the left and right brackets along the axis, the gap being adapted to receive a portion of the second shock absorber.

22. The suspension system of claim 20, wherein the axis is a first pivot axis;

the suspension system further comprising:
- a bracket arm having a first end and a second end, the first end of the bracket arm being fixedly connected to the first suspension arm between the upper end and the lower end of the first suspension arm; and
- a link having a first end and a second end, the first end of the link being pivotally connected to the second end of the bracket arm;
- wherein the lower end of the second shock absorber is pivotally connected to the second end of the link about a second pivot axis.
- wherein the first end of the link is pivotally connected to the second end of the bracket arm about a third pivot axis, the third pivot axis is above of the second pivot axis;
- wherein the lower ends of the left and right tie rods are pivotally connected to the link about a fourth pivot axis intermediate the second and third pivot axes; and
- wherein the lower end of the first suspension arm is pivotally connected to the rail about a fifth pivot axis, the second pivot axis being disposed below the first suspension arm and forward of the fifth pivot axis.

23. The suspension system of claim 22, wherein the second pivot axis is disposed above the fifth pivot axis.

\* \* \* \* \*